United States Patent [19]

Richardson

[11] Patent Number: 4,587,952
[45] Date of Patent: May 13, 1986

[54] PASSIVE SOLAR WATER HEATER

[76] Inventor: John L. Richardson, 1978 West 33rd Ave., Vancouver, British Columbia, Canada, V6P 1B5

[21] Appl. No.: 733,275

[22] Filed: May 10, 1985

[51] Int. Cl.[4] .................................................. F24J 2/56
[52] U.S. Cl. ..................................... 126/450; 126/438; 126/437; 126/424
[58] Field of Search ............... 126/438, 425, 424, 439, 126/443, 450, 437

[56] References Cited

U.S. PATENT DOCUMENTS

| | | | |
|---|---|---|---|
| 4,205,659 | 6/1980 | Beam | 126/425 |
| 4,351,319 | 9/1982 | Robbins, Jr. | 126/439 |
| 4,355,629 | 10/1982 | Cornell | 126/450 |
| 4,406,279 | 9/1983 | Kohli | 126/450 |
| 4,413,618 | 11/1983 | Pitts et al. | 126/438 |

FOREIGN PATENT DOCUMENTS 148354  9/1983  Japan ................................... 126/437

Primary Examiner—James C. Yeung
Attorney, Agent, or Firm—Townsend and Townsend

[57] ABSTRACT

A passive solar water heater comprising a collector enclosure having a transparent upper surface and a curved, reflective inner surface and end walls. A storage tank within the collector enclosure is positioned to be heated by the sun's rays both directly and reflected from the inner surface of the collector enclosure. The storage tank has a cylindrical wall and opposed end walls. A first pipe extends through and is attached to one end wall along the longitudinal axis of the storage tank and extends to a position adjacent the cylindrical wall, inside the storage tank. A second pipe extends through the other end wall, along the longitudinal axis of the storage tank, to a second position in the storage tank, also adjacent the cylindrical wall. The first and second positions are generally diametrically opposed to each other. The first and second pipes extend through the end walls of the collector enclosure to support the storage tank within the collector enclosure. The relative positions of the collector enclosure, the storage tank and mounting frame can be fixed as desired.

9 Claims, 6 Drawing Figures

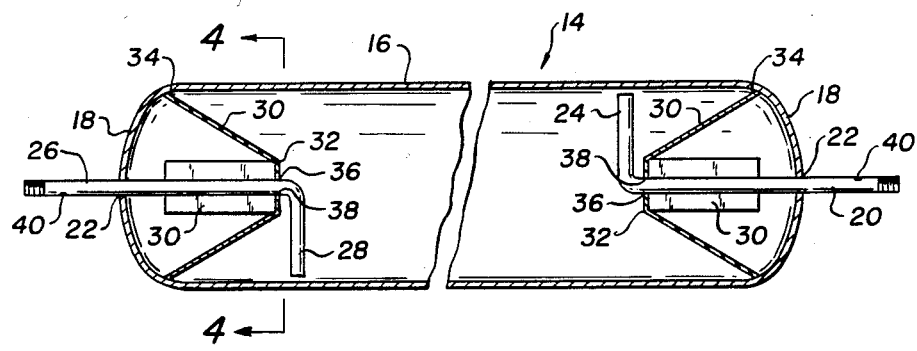
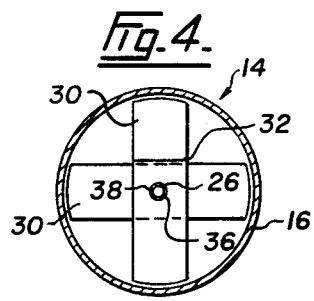
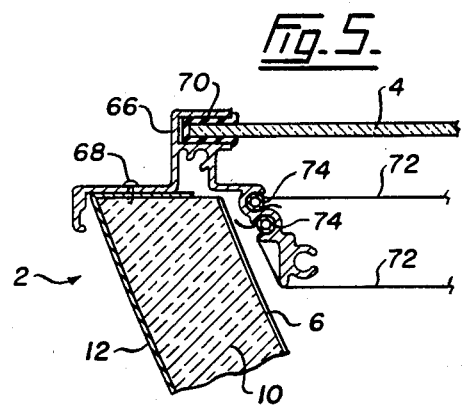
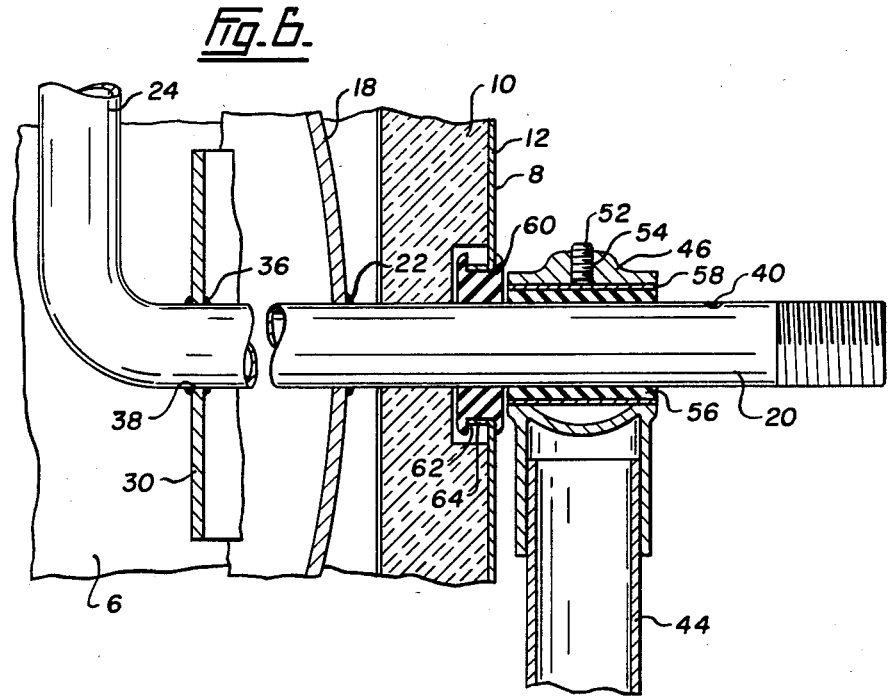

PASSIVE SOLAR WATER HEATER

FIELD OF THE INVENTION

This invention relates to passive solar water heater.

DESCRIPTION OF THE PRIOR ART

The commercial use of solar hot water systems, prompted by their economy of use, has led to a substantial amount of development work in the field. A noticable trend has been towards simpler systems, less costly to produce, easy to install and not prone to failure of moving parts.

The best known non-mechanical solar hot water system is the thermosyphon system. The system functions by carrying solar heat from solar collectors to an insulated storage tank mounted above the collectors by the well known thermosyphon effect. However a system simpler than the thermosyphon system is the passive solar water heater, also known as a batch, breadbox or integral collector/storage (ICS) system. The important difference between the two systems is that the solar collector surface in the passive system is also the tank surface so that collection and storage can be incorporated into one unit, using much less material compared with thermosyphon systems. The passive system forms essentially a solar heated bulge in the incoming cold water pipe to the hot water system. Thus the mounting elevation in relation to the building or water supply system is dependent only upon the water pressure available to move the water through the solar heater to the points where it is required.

In existing passive solar water heaters the tank is mounted in a fixed position inside the enclosure. The hot water outlet position on the tank is arranged so that when the heater is mounted at a certain angle to the sun the outlet will be at the highest position in the tank for maximum air expulsion. If the tank is positioned so that the hot water outlet pipe opening is not at the highest point in the tank the amount of air trapped in the top of the tank will increase, thus reducing heat transfer efficiency to the water by reducing the area of contact between the water and the tank. The problem with this arrangement, particularly with horizontally mounted tanks, is that there is little on-site flexibility with the slope angle. This becomes evident at different latitudes and with varied roof slopes. Further, the opportunity to adjust the slope angle to increase solar collection seasonally does not exist or is difficult to accomplish.

The present invention seeks to provide a passive solar water heater system that is free of the disadvantages discussed above and yet simple in structure.

Passive solar water heaters have been the subject of other patents. Prior art known to applicant comprises the following U.S. Pat. Nos: 4,365,615 to Melvin; 4,409,962 to Riley; 4,416,257 to Bale; 4,355,629 to Cornell; 4,372,651 to Hutchison; and 4,351,319 to Robbins.

Of the above patents Hutchison discloses a solar collector comprising a plurality of high structural integrity modules, liquid conduit and a support structure. The collector rotates about a horizontal axis and a suitable tracking means is provided to aim the collector towards the sun to obtain maximum heating efficiency at all times. The conduit is fixed and occupies the focal line of the parabolic trough shown in Hutchison.

Cornell shows a passive solar water heater that minimizes heat loss due to radiation, conduction and convection.

Melvin teaches a solar hot water heater comprising a thermostatically controlled winch, insulated fluid storage tank, fluid storage tanks and hinged solar reflector lid. The lid is raised by the winch to a predetermined position when a sensor is activated by the sun's rays.

Riley teaches a water storage tank for a solar water heater having a thermosyphon hot fluid return connection in its upper portion and a thermosyphon cold flow connection in its lower portion.

Robbins discloses a radiant energy tracker that maintains a radiation sensitive portion of the apparatus in alignment with a source of radiant energy. A tank is pivotally mounted in a movable frame. Conduits provide fluid flow. A reflector is also secured to the frame and directs incident light to the tank.

Bale discloses a solar energy collector having a reflector and a fixed tank.

SUMMARY OF THE INVENTION

The present invention provides a passive solar water heater comprising a collector enclosure having a transparent upper surface and a curved, reflective inner surface and end walls; a storage tank within the collector positioned to be heated by the sun's rays reflected from the inner surface of the collector enclosure and having a cylindrical wall curved to reflect sunlight from a range of angles onto the tank and opposed end wall; a first pipe extending through and attached to one end wall along the longitudinal axis of the storage tank and extending to a first position, adjacent to the cylindrical wall, inside the storage tank; a second pipe extending through and attached to the other end wall along the longitudinal axis of the storage tank and extending to a second position in the storage tank, adjacent to the cylindrical wall; said first and second positions being generally diametrically opposed to each other; the first and second pipes extending through the end walls of the collector enclosure to support the storage tank within the collector enclosure; and releasable means to fix the relative positions of the collector enclosure and the storage tank as desired.

DRAWINGS

Aspects of the invention are illustrated, merely by way of example, in the accompanying drawings in which:

FIG. 3 is a section through the storage tank useful with the solar water heater system of FIG. 1;

FIG. 4 is a view on the line 4—4 in FIG. 3;

FIG. 5 is a detail on the line 5—5 in FIG. 1; and

FIG. 6 is a section on the line 6—6 in FIG. 1.

DESCRIPTION OF THE PREFERRED EMBODIMENTS

Figure 1:
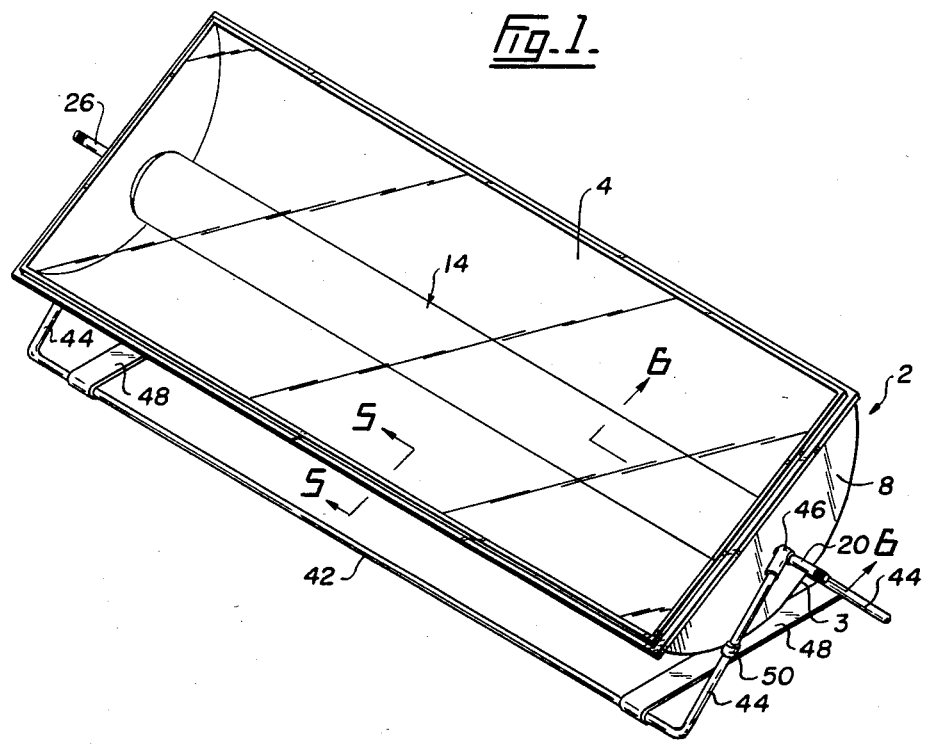
FIG. 1 is an overall view of the passive solar water heater according to the present invention.
Figure 2:
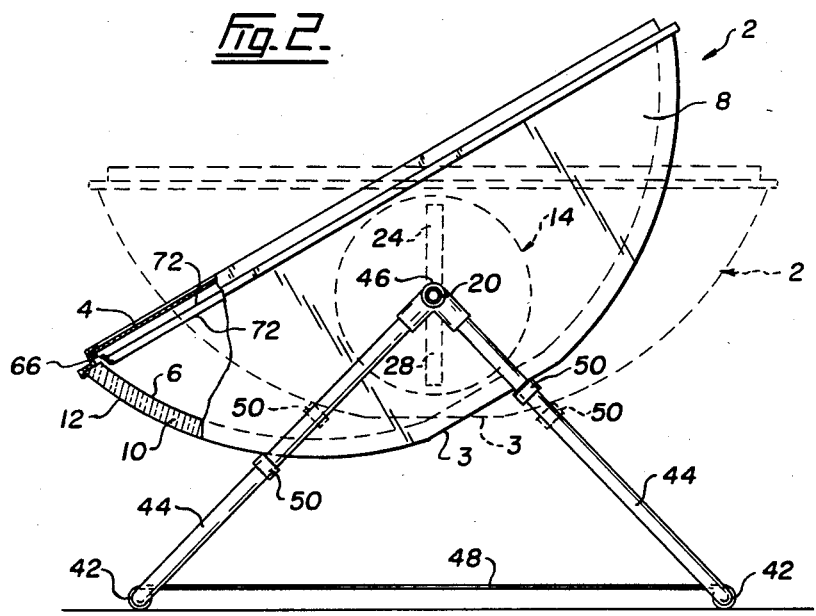
FIG. 2 is a side elevation of the heater of FIG. 1.

The drawings show a passive solar water heater according to the present invention comprising, as shown generally in FIGS. 1 and 2, a collector enclosure 2 having a flattened portion 3, a transparent upper surface 4, a curved reflective inner surface 6 and end walls 8. As shown particularly in FIGS. 2, 5 and 6 the walls of the collector enclosure comprise a good insulating material 10, typically a foamed synthetic resin, for example polyurethane, having the reflective inner surface 6 and an outer casing 12.

There is a storage tank 14 within the collector enclosure 2 positioned to be heated by the sun's rays reflected from the inner surface 6 of the collector enclosure 2. Tank 14 has a cylindrical wall 16 and opposed end walls 18. The storage tank 14 is shown particularly in FIG. 3.

A first pipe 20 extends through and is attached to one end wall 18 at 22—see particularly FIGS. 3 and 6. The first pipe 20 extends along the longitudinal axis of the storage tank 14 and extends to a first position 24, generally adjacent to the cylindrical wall 16 when inside the storage tank 14. At the other end of the heater a second pipe 26 extends through and is attached to the other end wall 18 and again extends along the longitudinal axis of the storage tank 14 and to a second position 28 in the storage tank 14 adjacent the cylindrical wall 16. These first and second positions 24 and 28 are generally diametrically opposed to each other, again as particularly illustrated in FIGS. 2 and 3.

The storage tank 14 is provided with inner braces 30 to support the pipes 20 and 26. The braces 30 are welded to each other at 32, to the storage tank at 34 and to the pipes at 36. An opening 38 is formed in the braces 30 to receive the first and second pipes 20 and 26.

As indicated particularly in FIG. 6 a small mark 40 should be made on the exterior of the pipes 20 and 26 to indicate which way the pipe bends when in the storage tank 14. The interior of the storage tank 14 cannot, of course, be viewed from the exterior of the heater.

The arrangement of the pipes 20 and 26 and the braces 30 ensures that the storage tank 14 is supported within the collector enclosure 2 on the pipes 20 and 26.

As shown particularly in FIGS. 1 and 2 the heater is provided with a support frame comprising longitudinal members 42 having pairs of legs 44 extending upwardly at each end of the heater to meet at junction 46. Cross braces 48 are provided. As shown particularly in FIG. 2 locking collars 50 can slide on the legs thus permitting variation of the angle of the collector enclosure 2 to the sun with great ease without causing the collector tank to rotate from its preferred position. The means of locking the enclosure in position is by the use of collars 50 in a manner well known in the tube art.

Storage tank 14 is fixed in its rotational position by connecting piping firmly affixed to pipes 20 and 26.

The heater has releasable means to fix the relative positions of the collector enclosure 2 and the storage tank 14 and also the relative position of both to the ground or mounting surface. As shown particularly in FIG. 6 each means may include a set screw 52 in a threaded opening 54 in the junction 46 of the legs 44. Tightening of the set screw 52 acts to compress the centre housing of the frame on the pipe.

As shown in FIG. 6 the junction 46 is provided with a bushing 56, rubber or neoprene and having a sleeve 58, for example of aluminum. The bushing 56 provides a good friction fit on the pipes 20 and 26 and provides thermal resistance to heat loss from the pipes 20 and 26 to the ferame 44. Similarly the pipes 20 and 26, where they extend through the end walls 8 of the collector enclosure 2 extend through grommets 60 having an external peripheral channel 62 to engage on flanges 64 formed in the exterior surface 12 of the collector enclosure 2.

As shown in FIG. 5 the collector enclosure 2 has a glazed upper surface 4 mounted in housings 66 attached to the collector enclosure 2 and 68. The glazing is positioned in a gasket 70 extending round the periphery of the collector enclosure 2 in housing 66. In the illustrated preferred embodiment additional films of plastic 72, typically of polytetrafluoroethylene, are located by splines 74 to provide additional insulation by providing up to a three layer system, as shown particularly in FIG. 5, trapping two layers of air. Such a system is particularly desirable in cooler climates for good heat retention.

The operation of the heater according to the present invention is extremely simple. To position the collector enclosure the collars 50 are released and the enclosure 2 rotated until the desired angle is achieved. The set screw 52 is released and the storage tank 14 rotated on the pipes 20 and 26 until observation of the marks 40 on the exterior of the pipes indicates that the pipe 26 has its inlet for cold water at the lowest point in the tank 14 and pipe 20 has the outlet for hot water at the highest point in the tank 14. The necessary water connections are made at the pipes 20 and 26 using conventional threaded connections. The required rotational position of storage tank 14 that presents the best position for heat flow and venting is set in this way. Water is then allowed to pass through the heater where it is rapidly heated by the sun's rays directly and by focusing of the sun's rays by the reflective surface 6 onto the storage tank 14.

An important feature of the present invention is the storage tank support assembly. The arrangement described above ensures that the collector enclosure 2 and the storage tank 14 can be rotated independently of each other and without disturbing the water connections. This is so because the components have a common axis of rotation that is aligned with the central axis of the storage tank 14 and maintains symmetry within the heater regardless of rotation. The arrangement of the collector enclosure 2 and the storage tank 14 and their mounting on the pipes 20 and 26 ensure that no interference takes place between the structure and the support frame. The bracing 30 within the tank 14 ensures that the heater has adequate strength to be self-supporting.

The turned portions of the pipe 20 and 26 should always be vertical for efficient operation. The arrangement of this verticality of the pipes 20 and 26, independently of the position of the collector enclosure 2, is a simple matter with the heater of the present invention. The inlet and the outlet positions can be reversed simply by rotating the storage tank 14 through 180°. The storage tank 14 is also drainable by siphoning at the inlet connection. The collector enclosure is shaped so that all rays passing through the aperture from any altitude within a 60° range will fall on the storage tank either directly or by reflection when correctly positioned.

Thus the present invention provides a solar water heater in which the rotational position of the storage tank is independent of the rotational position of the collector enclosure. Both are independent of the slope angle of the mounting surface under the mounting legs. This arrangement allows the storage tank to be in the ideal position for air expulsion and for water inlet and outlet for any preferred slope of the collector enclosure whether mounted on flat or sloped surfaces. The collector enclosure can remain in one position year round or can be repositioned seasonally or as required for increasing the solar exposure without adjustment of tank position or without disconnecting the water connections. The provision of internal bracing means that the storage tank can be mounted on the water supply pipes thus avoiding interference with the rotation of the collector enclosure.

In constructing the heater of the present invention the usual regard should be had to ensuring that reflective surfaces are as brightly polished as possible and absorbent surfaces are as dark a colour as possible, typically matte black. That is the inner surface 6 of the collector enclosure 2 should be highly polished. The outer surface of the storage tank 14 should be painted matte black or more desirably coated with a black film that also incorporates the property of low emissivity to radiant heat loss. This would typically be the well known black chrome coating. The exterior of the collector enclosure 2 is desirably of aluminum or galvanized steel preferably prepainted. The legs may be of aluminum tubing for lightness. The storage tank 14 may be of stainless steel.

The present invention provides considerable simplification, coupled with excellent performance, at all times of the year, in passive solar water heaters.

I claim:

1. A passive solar water heater comprising a collector enclosure having a transparent upper surface and a curved, reflective inner surface and end walls;
   a storage tank within the collector enclosure positioned to be heated by the sun's rays both directly and reflected from the inner surface of the collector enclosure, and having a cylindrical wall and opposed end walls;
   a first pipe extending through and attached to one end wall along the longitudinal axis of the storage tank and extending to a first position, adjacent the cylindrical wall, inside the storage tank;
   a second pipe extending through and attached to the other end wall along the longitudinal axis of the storage tank and extending to a second position in the storage tank, adjacent the cylindrical wall;
   said first and second positions being generally diametrically opposed to each other;
   the first and second pipes extending through the end walls of the collector enclosure to support the storage tank within the collector enclosure;
   first releasable means to fix the relative positions of the collector enclosure and the storage tank as desired;
   a support frame for the heater and carrying the first and second pipes; and
   second releasable means on the support frame to allow variation and fixing of the angle of the collector enclosure without rotating the storage tank from its desired position.

2. A passive solar water heater as claimed in claim 1 in which the support frame includes a pair of legs at each end of the heater, the members of each pair of legs being arranged generally at right angles to each other;
   an opening formed at the meeting place of the legs to receive the first and second pipes at each end of the heater.

3. A passive solar water heater as claimed in claim 1 in which the means to fix the relative positions of the collector enclosure and the storage tank comprise a set screw associated with the support frame and adapted to apply pressure to an end pipe to prevent rotation of the pipe, and thus the storage tank, relative to the frame.

4. A passive solar water heater as claimed in claim 1 in which the collector enclosure comprises a metal casing and thermally insulating material with the reflective inner surface formed on it; and
   a glass upper surface.

5. A passive solar water heater as claimed in claim 4 in which the collector enclosure additionally includes transparent films, arranged between the outer glass surface and the storage tank to provide additional insulation.

6. A passive solar water heater as claimed in claim 5 in which the collector enclosure has two films arranged beneath the outer glazing, the films comprising spaced apart films of polytetrafluoroethylene.

7. A passive solar water heater as claimed in claim 1 in which the storage tank is formed with inner braces extending from the end of the tank towards the center of the tank;
   an opening formed in the braces to receive the first and second pipes.

8. A passive solar water heater as claimed in claim 1 in which the pipes are marked on their exterior to indicate whether the pipe extends to the first or second position, adjacent the cylindrical wall.

9. A passive solar water heater as claimed in claim 2 in which the second releasable means to allow variation and fixing of the angle of the collector enclosure comprises releasable collars receivable on the legs and able to abut and thus locate the collector enclosure.

* * * * *